US010459952B2

(12) United States Patent
Thuler et al.

(10) Patent No.: US 10,459,952 B2
(45) Date of Patent: Oct. 29, 2019

(54) CATEGORIZING SEARCH TERMS

(71) Applicant: Google Inc., Mountain View, CA (US)

(72) Inventors: Eduardo Knust Thuler, Mountain View, CA (US); Pavan Desikan, Palo Alto, CA (US); Rafael Dantas de Castro, Belo Horizonte (BR)

(73) Assignee: Google LLC, Mountain View, CA (US)

( * ) Notice: Subject to any disclaimer, the term of this patent is extended or adjusted under 35 U.S.C. 154(b) by 285 days.

(21) Appl. No.: 15/409,477

(22) Filed: Jan. 18, 2017

(65) Prior Publication Data

US 2017/0124180 A1 May 4, 2017

Related U.S. Application Data

(63) Continuation of application No. 13/957,345, filed on Aug. 1, 2013, now Pat. No. 9,576,042.
(Continued)

(51) Int. Cl.
*G06F 16/00* (2019.01)
*G06F 16/28* (2019.01)
*G06F 16/951* (2019.01)
*G06F 16/958* (2019.01)
*G06F 16/955* (2019.01)

(52) U.S. Cl.
CPC .......... *G06F 16/285* (2019.01); *G06F 16/951* (2019.01); *G06F 16/958* (2019.01); *G06F 16/9566* (2019.01)

(58) Field of Classification Search
CPC .. G06F 16/285; G06F 16/9566; G06F 16/958; G06F 16/2428; G06F 16/338; G06F 16/9038; G06F 16/951; G06F 16/9535; G06F 17/30598; G06F 17/30887; G06F 17/30864; G06F 17/3089; G06F 17/30;
(Continued)

(56) References Cited

U.S. PATENT DOCUMENTS 6,198,779 B1 3/2001 Taubenheim et al.
6,990,496 B1 1/2006 McGee, III et al.
(Continued)

OTHER PUBLICATIONS

Agosti et al., "Web log analysis: a review of a decade of studies about information acquisition, inspection and interpretation of user interaction," Data Mining and Knowledge Discovery, Jul. 2011, pp. 663-696, vol. 24, No. 3i.
(Continued)

*Primary Examiner* — Anh Ly
(74) *Attorney, Agent, or Firm* — Lowenstein Sandler LLP

(57) ABSTRACT

A system and method are disclosed for categorizing search terms. The system accesses search history for the search terms. The system also categorizes each of the search terms based on the number of times that the respective search term appears in the search history. If the number of times the search term appears in the search history exceeds a first threshold, a search result of the search term is determined and the search term is categorized as a type that is provided for registration to a user with recognized association with the search term or a type that is excluded from registration, where the categorizing based on a ratio of a number of times the search result was selected subsequent to receiving the search term to the number of times that the search term appears in the search history.

20 Claims, 4 Drawing Sheets

Related U.S. Application Data

(60) Provisional application No. 61/678,585, filed on Aug. 1, 2012.

(58) Field of Classification Search
CPC ............ G06F 17/30651; G06G 16/951; G06Q 30/08; H04L 29/12037; H04L 29/12933
See application file for complete search history.

(56) References Cited

U.S. PATENT DOCUMENTS

| | | | |
|---|---|---|---|
| 8,521,526 B1 | 8/2013 | Lloyd et al. | |
| 8,538,982 B2* | 9/2013 | Effrat | G06F 16/951 707/769 |
| 8,868,590 B1 | 10/2014 | Donneau-Golencer | |
| 8,914,311 B2 | 12/2014 | Malik et al. | |
| 9,026,592 B1 | 5/2015 | Marra | |
| 2003/0233350 A1 | 12/2003 | Dedhia et al. | |
| 2004/0123319 A1 | 6/2004 | Kim | |
| 2004/0167845 A1 | 8/2004 | Corn et al. | |
| 2005/0177844 A1* | 8/2005 | Levi | G06Q 30/02 725/30 |
| 2006/0242554 A1* | 10/2006 | Gerace | G06F 17/30867 715/209 |
| 2007/0050335 A1* | 3/2007 | Kashima | G06F 17/30864 707/E17.108 |
| 2007/0050339 A1* | 3/2007 | Kasperski | G06F 16/9032 707/E17.136 |
| 2008/0016034 A1* | 1/2008 | Guha | G06F 16/954 707/E17.108 |
| 2008/0097982 A1* | 4/2008 | Gupta | G06F 17/30864 707/E17.108 |
| 2008/0162540 A1* | 7/2008 | Parikh | G06F 16/9535 707/E17.109 |
| 2008/0243833 A1 | 10/2008 | Wang | |
| 2008/0249855 A1* | 10/2008 | Collins | G06Q 30/00 705/14.54 |
| 2008/0301138 A1 | 12/2008 | Hasan et al. | |
| 2009/0138473 A1* | 5/2009 | Manabe | G06F 17/30675 707/E17.044 |
| 2009/0192892 A1 | 7/2009 | Cason | |
| 2009/0192983 A1* | 7/2009 | Elango | G06F 17/3064 707/E17.001 |
| 2009/0228315 A1 | 9/2009 | Athey et al. | |
| 2009/0265338 A1* | 10/2009 | Kraft | G06F 17/30864 707/E17.014 |
| 2009/0271374 A1 | 10/2009 | Korn et al. | |
| 2009/0313194 A1* | 12/2009 | Amar | G06F 17/30707 706/20 |
| 2010/0062745 A1* | 3/2010 | Silk | G06Q 10/10 455/411 |
| 2011/0010367 A1* | 1/2011 | Jockish | G06F 17/30675 707/733 |
| 2011/0029509 A1* | 2/2011 | Kumthekar | G06F 16/9535 707/723 |
| 2011/0173229 A1 | 7/2011 | Choudhury et al. | |
| 2011/0176710 A1 | 7/2011 | Mattiuzzi et al. | |
| 2011/0184948 A1 | 7/2011 | Tseng et al. | |
| 2011/0184984 A1 | 7/2011 | Getner | |
| 2011/0222397 A1 | 9/2011 | Wang et al. | |
| 2012/0271877 A1 | 10/2012 | Nicks et al. | |
| 2012/0290566 A1* | 11/2012 | Dasher | G06F 16/951 707/723 |
| 2012/0323901 A1* | 12/2012 | Masuko | G06F 17/30253 707/723 |
| 2013/0006764 A1* | 1/2013 | Zhang | G06Q 30/0254 705/14.52 |
| 2013/0325892 A1 | 12/2013 | Edwards et al. | |
| 2014/0040271 A1 | 2/2014 | Thuler et al. | |
| 2014/0143196 A1 | 5/2014 | White et al. | |
| 2015/0088859 A1 | 3/2015 | Weissl et al. | |
| 2015/0161129 A1 | 6/2015 | Miller et al. | |
| 2018/0365707 A1* | 12/2018 | Jha | G06Q 30/0245 |

OTHER PUBLICATIONS

Chuang et al., "Live Thesaurus Construction for Interactive Voice-based Web Search," INTERSPEECH, 2000, pdfs.sematicscholar.org.

Tan et al., "Mining Long-Term Search History to Improve Search Accuracy," Aug. 2006, KDD '06, Proceedings of the 12$^{th}$ ACM SIGKDD International Conference on Knowledge Discovery and Data Mining, pp. 718-723.

PCT International Search Report and Written Opinion for International Application No. PCT/US2013/053305 dated Oct. 28 2013, 9 pages.

* cited by examiner

305 — First come first serve term type

310 — Reserved with additional verification of association term type

315 — Generic term type, excluded from registration

320 — Top term type, can be registered by a user with recognized association with the search term

FIG. 3

CATEGORIZING SEARCH TERMS

CROSS-REFERENCE TO RELATED APPLICATIONS

The present application claims the benefit of priority under 35 U.S.C. § 120 as a continuation from U.S. patent application Ser. No. 13/957,345 entitled "CATEGORIZING SEARCH TERMS," filed on Aug. 1, 2013, which claims the benefit of priority under 35 U.S.C. § 119 from U.S. Provisional Patent Application Ser. No. 61/678,585, filed on Aug. 1, 2012, all of which are hereby incorporated by reference in their entirety for all purposes.

BACKGROUND

The subject technology generally relates to categorizing search terms.

A uniform resource locator ("URL") is may be assembled in a way to convey a message or an association. Registration of URL may be obtained on a first come first serve basis, where the first user to select a unique URL obtains the right to use the URL. Sometimes, the first user to come up with a URL has little or no association with the message conveyed by the selected URL.

SUMMARY

The disclosed subject matter relates to a computer-implemented method including accessing search history for one or more search terms, wherein the search history comprises prior user search terms. The method further includes categorizing each of the one or more search terms based on the determined number of times the respective search term appears in the search history. For each of the one or more search terms, the categorizing includes in a case where the number of times that the search term appears in the search history exceeds a first threshold value, identifying, from the search history, a search result of the search term, and categorizing, the search term as a type that is provided for registration to a user with recognized association with the search term or a type that is excluded from registration, wherein the categorizing is based on a ratio of a number of times the search result was selected subsequent to receiving the search term to the number of times that the search term appears in the search history.

These and other aspects can include one or more of the following features. For each of the one or more search terms, the categorizing further includes, in a case where the number of times that the search term appears in the search history does not exceed a second threshold value, categorizing the search term as a type that can be reserved on a first come first serve basis. For each of the one or more search terms, categorizing the respective search term may further include in a case where the number of times that the search term appears in the search history does not exceed the first threshold value and exceeds the second threshold value, the search term is categorized as a type that can be reserved with additional verification of association with the search term. The search term may be categorized as a type that is provided for registration to a user with recognized association with the search term if the ratio of the number of times the search result was selected subsequent to receiving the search term to the number of times that the search term appears in the search history exceeds a third threshold value. The search term may be categorized as a type that is excluded from registration if the ratio of the number of times the search result was selected subsequent to receiving the search term to the number of times that the search term appears in the search history does not exceed the third threshold value. The search result may include a character string for a uniform resource locator, where the character string includes the search term.

For each of the one or more search terms, categorizing the respective search term may further include determining if the search term is a restricted term, and designating the search term as a term that is excluded from registration if the search term is a restricted term. A restricted term may be a trademark.

Accessing the search history for search terms and categorizing the search terms may each be performed on a periodic basis. The search terms may be periodically categorized based on one or more user inputs.

The search term may be a single term. The search term may also be a composite term, where the composite term includes two or more terms. The method may further include filtering the search terms for a term corresponding to a user selected search term, and designating registration requirement of the user selected search term based on a type of the corresponding term. The method may further include determining one or more locales where the prior user action was performed by users. For each of the one or more locales, the search term is categorized as a type that is provided for registration to a user with recognized association with the search term if the ratio of the number of times the search result was selected by users in the locale subsequent to receiving the search term to the number of times that the search term appears in the search history exceeds a fourth threshold value. For each of the one or more populations, the search term is categorized as a type that is excluded from registration if the ratio of the number of times the search result was selected by users of the locale subsequent to receiving the search term to the number of times that the search term appears in the search history does not exceed the third threshold value.

The disclosed subject matter also relates to a system including one or more processors, and a machine-readable medium including instructions stored therein, which when executed by the processors, cause the processors to perform operations including accessing search history for one or more search terms, where the search history includes prior user search terms. The operations further include accessing search history for one or more search terms, wherein the search history comprises prior user search terms. The operations further include categorizing each of the one or more search terms based on the determined number of times the one or more search terms appear in the search history, wherein for each of the one or more search terms, the categorizing includes, in a case where the number of times that the search term appears in the search history exceeds a first threshold value, identifying, from the search history, a search result of the search term, and categorizing, the search term as a type that is provided for registration to a user with recognized association with the search term or a type that is excluded from registration, wherein the categorizing is based on a ratio of a number of times the search result was selected subsequent to receiving the search term to the number of times that the search term appears in the search history. For each of the one or more search terms, the categorizing further includes, in a case where the number of times that the search term appears in the search history does not exceed a second threshold value, categorizing the search term as a type that can be reserved on a first come first serve basis. For each of the one or more search terms, the categorizing further includes, in a case where the number of times that the search term appears in the search history does not exceed the first threshold value and exceeds the second threshold value, categorizing the search term as a type that can be reserved with additional verification of association with the search term.

These and other aspects can include one or more of the following features. The search term may be categorized as a type that is provided for registration to a user with recognized association with the search term if the ratio of the number of times the search result was selected subsequent to receiving the search term to the number of times that the search term appears in the search history exceeds a third threshold value. The search term may be categorized as a type that is excluded from registration if the ratio of the number of times the search result was selected subsequent to receiving the search term to the number of times that the search term appears in the search history does not exceed the third threshold value. The search result may include a character string for a uniform resource locator, where the character string includes the search term.

For each of the one or more search terms, categorizing the search term may further include determining if the search term is a restricted term, and designating the search term as a term that is excluded from registration if the search term is a restricted term. One of the one or more restricted terms may be a trademark.

The disclosed subject matter also relates to a machine-readable medium comprising instructions stored therein, which when executed by a processor, cause the processor to perform operations including accessing search history for one or more search terms, wherein the search history comprises prior user search terms. The method further includes determining, for each of the one or more terms, a number of times a respective search term appears in the search history. The operations further include categorizing each of the one or more search terms based on the determined number of times the one or more search terms appear in the search history, wherein for each of the one or more search terms, the categorizing includes, in a case where the number of times that the search term appears in the search history exceeds a first threshold value, identifying, from the search history, a search result of the search term, categorizing the search term as a type that is provided for registration to a user with recognized association with the search term or a type that is excluded from registration, wherein the categorizing is based on a ratio of a number of times the search result was selected subsequent to receiving the search term to the number of times that the search term appears in the search history. For each of the one or more search terms, the categorizing further includes, in a case where the number of times that the search term appears in the search history does not exceed a second threshold value, categorizing the search term as a type that can be reserved on a first come first serve basis. For each of the one or more search terms, the categorizing further includes, in a case where the number of times that the search term appears in the search history does not exceed the first threshold value and exceeds the second threshold value, categorizing the search term as a type that can be reserved with additional verification of association with the search term.

These and other aspects can include one or more of the following features. Prior user action may include selecting a character string for a uniform resource locator, where the character string includes the search term.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

FIG. 3 is an example illustration for organizing search terms based on their respective categorization.

DETAILED DESCRIPTION

Figure 1:
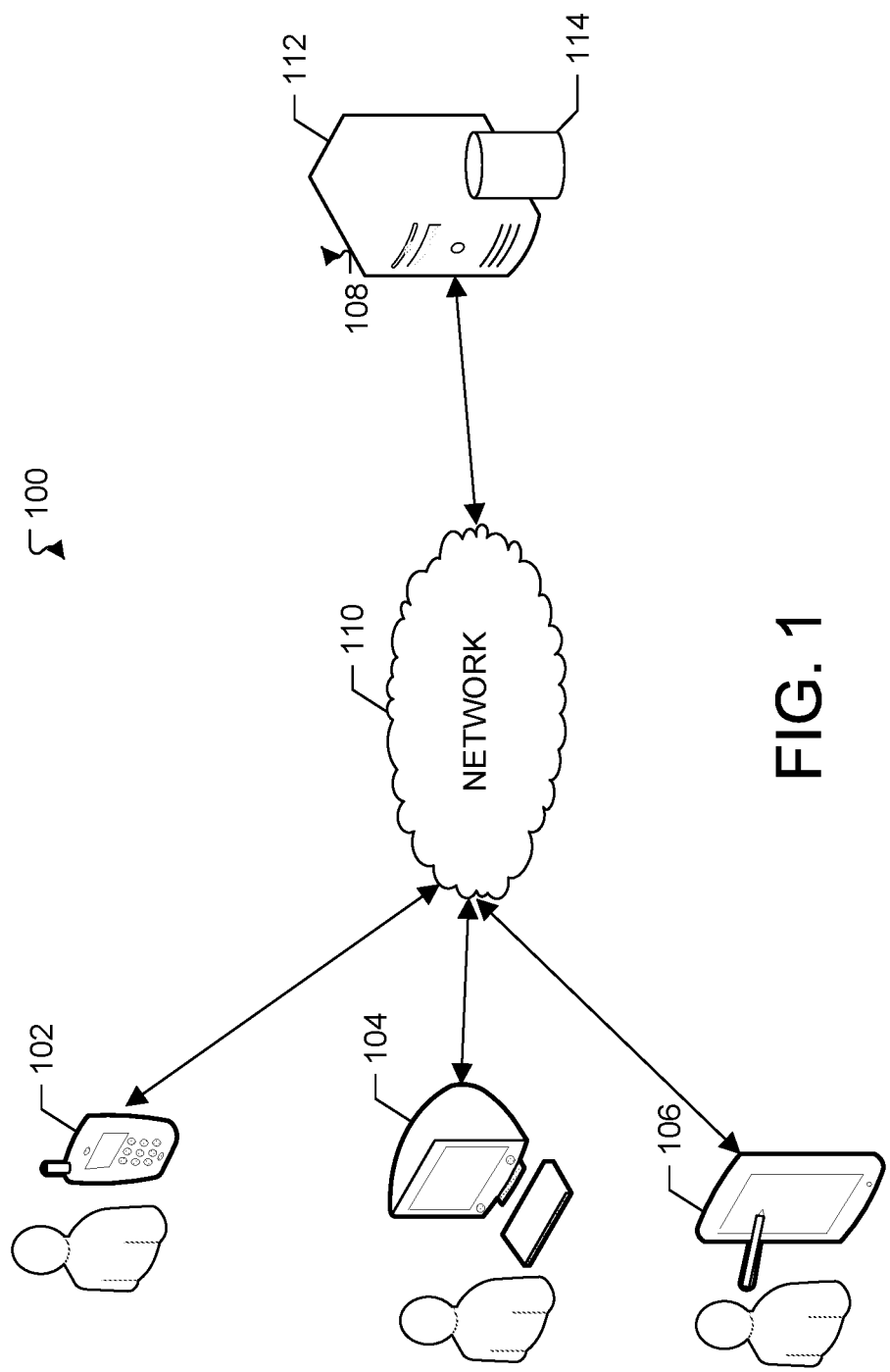
FIG. 1 illustrates an example network environment for categorizing search terms.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

In accordance with the subject technology, a system and a method for categorizing search terms are provided. The subject technology has access to search history for prior user search terms. In one example, the search history is stored on a server's database and contains information regarding the prior user search terms, such as the number of times a particular search term was previously entered. A search term may include characters, numbers, symbols, etc. Furthermore, a search term may be a single term (e.g., "john"), or a composite term (e.g., "johnwater"). A search term may be a term that was previously entered into a search engine.

The subject technology accesses a search history that contains prior user search terms, and categorizes a prior user search term as a generic term, e.g., which is excluded from registration, a top term, which can be registered by a user with recognized association with the term, a search term that is available on a first come first serve basis, or a search term that is available pending additional verification of user association with the search term based on a number of times that the search term appears in the search history. A user seeking to obtain a URL that includes the search term may be restricted from obtaining the URL, allowed to obtain the URL on a first come first serve basis, or required to provide verification of association with the search term in order to obtain the URL.

If the number of times that a search term appears in the search history exceeds a threshold value, the search term may be categorized as a generic term, and a URL containing the search term is excluded from registration. Alternatively, if the number of times that the search term appears in the search history does not exceed the threshold value, the search term may be categorized a top term, where the search term is recognized to be associated with a user or an entity and is provided for registration to the user or entity that is recognized to be associated with the search term.

One example method for determining whether a search term is a top term or a generic term depends on whether user actions subsequent to entering the search term on different occasions are consistent. For example, if a majority of prior user actions subsequent to entering the search term "john" consist selecting www.johndoe.com, then "john" is considered to be a top term and would be reserved for johndoe.com. Alternatively, if there is no consistent prior user action subsequent to entering the search term "john," then the search term "john" may be considered as a generic term.

Some high frequency search terms may be associated with a user or entity by users within one local population, and may be considered to a generic term that is not associated with any user or entity by users within a second local population. In one example, the search term "john" may consistently be associated with johndoe.com by users within the United States, but may not be associated with any user or entity by users in Germany. In this scenario, whether the search term "john" is considered a top term or a generic term may depend on popularity of the term "john" with respect to the local population of United States and Germany respectively. Additionally, the population size of the United States vs. the population size of Germany may also determine whether the term "john" is considered as a top term or a generic term.

If the number of times that a search term appears in the search history does not exceed a threshold value, the search term may be considered to be non-generic and not belonging to any user or entity. In this case, any user or entity may reserve the search term on a first come first serve basis. Furthermore, if the number of times that a search term appears in the search history exceeds the threshold value allowed for the search term to be reserved on a first come first serve basis but does not exceed the threshold value allowed for the search term is considered to be either a generic term or a top term may be considered as a semi-restricted term, the search term may be obtained if a user or entity can prove a legitimate association with the search term.

A composite search term (e.g., "johndoe" or "johnwater") is analyzed in its entirety. For example, if the number of times johndoe appears in the search history exceeds a threshold value, then johndoe is categorized as either a generic term or a top term. However categorization of johndoe does not affect the categorization of john or doe.

The subject technology may restrict registration of certain search terms regardless of the number of times they appear in the search history. In one example, the subject technology has access to a database that contains trademarks, and filters the trademark database for search terms. In general, if a search term is determined to be a trademark, the search term is excluded from registration unless the user can prove that the user is authorized to use the trademark as part of the user's URL.

The subject technology may periodically update the search terms to ensure each search term is accurately categorized. In one example, the subject technology may periodically filter the search history to determine the number of times each of the search terms appear in the search history, and categorize the search terms, where each search term is categorized into different categories based on the algorithms described herein. In another example, categorization of a search term may be modified by developers or other users who are authorized to modify the search term's category.

FIG. 1 illustrates an example network environment for categorizing search terms. A network environment 100 includes a number of electronic devices 102, 104, and 106 communicably connected to a server 108 by a network 110. Server 108 includes a processing device 112 and a data store 114. Processing device 112 executes computer instructions stored in data store 114, for example, to categorize search terms based on a number of times that the search terms appear in a search history. The search history may be stored in stored in the data store or another data base that is accessible to server 108.

In some example aspects, each of the electronic devices 102, 104, or 106 may include any machine that can transmit a user search term to server 108. Electronic devices 102, 104, and 106 can be mobile devices (e.g., smartphones, tablet computers, PDAs, and laptop computers), portable media players, desktop computers or other appropriate computing devices. In the example of FIG. 1, electronic device 102 is depicted as a smartphone, electronic device 104 is depicted as a desktop computer, and electronic device 106 is depicted as a tablet computer.

An application (e.g., web browsing application, electronic messaging application, etc.) running on electronic device 102, 104, or 106 may provide an interface for a user to enter a search term. Electronic device 102, 104, or 106 may transmit the search term to server 108. Electronic device 102, 104, or 106 may also transmit data corresponding to user actions related to the search terms (e.g., a user's action subsequent to entering the search term, etc.) to server 108 via network 110.

Server 108 may be any system or device having a processor, memory, and communications capability for providing messaging recommendations for electronic messaging. Server 108 may be a single computing device such as a computer server. Server 108 may also represent more than one computing device working together to perform the actions of a server computer.

Server 108 includes a processing device 112 and a data store 114. Processing device 112 executes computer instructions stored in a computer-readable medium, for example, to categorize search terms based on a number of times that the search terms appear in a search history and to provide a search term corresponding to a user designated term to electronic device 102, 104, or 106.

Server 108 accesses search history, which contains prior user search terms to determines a number of times that a search term appears in the search history and categorizes the search term based on the determined number of times that the search term appears in the search history. In a case where the number of times that the search term appears in the search history exceeds a first threshold value, categorizing the search term includes determining, a search result of the search term, and categorizing the search term as a type that is provided for registration to a user with recognized association with the search term or a type that is excluded from registration based on a ratio of a number of times the search result was selected subsequent to receiving the search term to the number of times that the search term appears in the search history. In a case where the number of times that the search term appears in the search history does not exceed a second threshold value, the search term is categorized as a type that can be reserved on a first come first serve basis.

Server 108 may receive a user-designated search term. Server 108 may filter the search terms for a search term corresponding to the user-designated search term. Server 108 may, based on type of the search term, allow, reject, or restrict registration of a domain name that includes the user-designated search term.

Network 110 can include, for example, any one or more of a cellular network, a satellite network, a personal area network (PAN), a local area network (LAN), a wide area network (WAN), a broadband network (BBN), the Internet, and the like. Further, the network 108 can include, but is not limited to, any one or more of the following network topologies, including a bus network, a star network, a ring network, a mesh network, a star-bus network, tree or hierarchical network, and the like.

Figure 2:
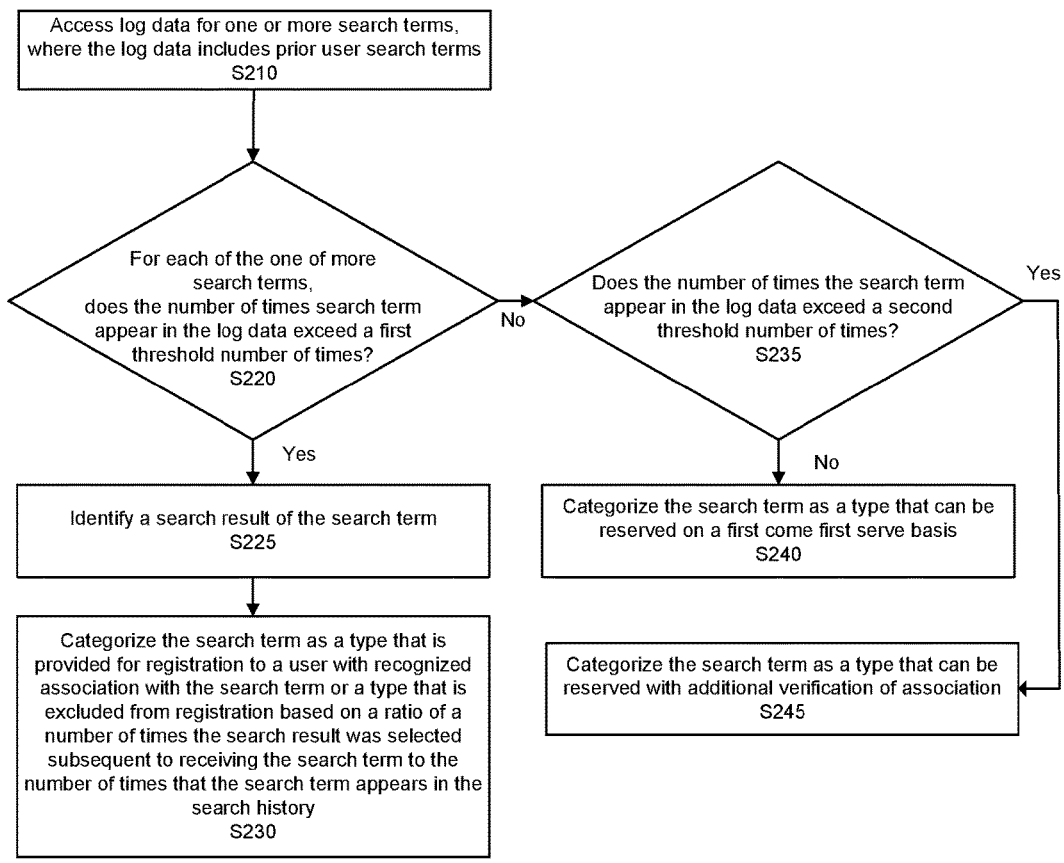
FIG. 2 illustrates an example process for categorizing search terms.

FIG. 2 illustrates an example process 200 for categorizing search terms. Although the operations in process 200 are shown in a particular order, certain operations may be performed in different orders or at the same time.

In block 210, server 108 accesses search history for one or more search terms, where the search history includes prior user search terms. In one example, the search history is stored in a database that is accessible to server 108. In another example, the search history is stored in data store 114. A search term may be a single term (e.g., "john," "water," etc.). Alternatively, the search term may be a composite term (e.g., "johnwater," etc.). Server 108 may also determine a number of times that the search terms appear in the search history.

In block S220, server 108 determines, for each of the one or more search terms, whether the number of times the respective search term appears in the search history exceeds a first threshold value. If the number of times that the search term appears in the search history exceeds the first threshold value, the process proceeds to block S225 and server 108 identifies, from the search history the search history, a search result of the search term. In one example, a search result of the search term "johndoe" is a link for "johndoe.com." Server 108 may also determine a number of times a prior user action was performed subsequent to receiving a search result based on the search term. In one example, a prior user action consists selecting a uniform resource locator that includes the search term.

In block S230, server 108 categorizes the search term as a type that is provided for registration to a user with recognized association with the search term or a type that is excluded from registration, wherein the categorizing is based on a ratio of a number of times the search result was selected subsequent to receiving the search term to the number of times that the search term appears in the search history. Server 108 categorizes the search term as a type that is provided for registration to a user with recognized association with the search term if the number of times a search result containing the search term was selected subsequent to receiving a search result based on the search term to the number of times the search term appears in the search history exceeds a third threshold value. In another example, server 108 categorizes the search term as a type that is excluded from registration if the ratio of the number of times the search result was selected subsequent to receiving the search term to the number of times that the search term appears in the search history does not exceed the third threshold value. In another example, if multiple search results are associated with the search term, determining whether the search term is a type that is excluded from registration or a type that is provided for registration to a user with recognized association with the search term is be based on the ratio of the number of times the most selected search results was selected subsequent to receiving the search term to the number of times the search term appears in the search history. In a further example, if multiple search results are associated with the search term, determining whether the search term is a type that is excluded from registration or a type that is provided for registration to a user with a recognized association with the search term is based on a ratio of the number of times one of the selected search results was selected subsequent to receiving the search term to the number of times one or more different search results were selected subsequent to receiving the search term.

In a further example, if multiple search results are associated with the search term, determining whether the search term is a type that is excluded from registration or a type that is provided for registration to a user with recognized association with the search term is based on the number of search results that are associated with the search term. For example, if the number of different search results that are associated with the search term exceeds a certain threshold value, then the search term is categorized as a type that is excluded from registration. However, if the number of different search results that are associated with the search term does not exceed a certain threshold value, then the search term is categorized as a type that can be registered by a user with recognized association with the search term.

In another aspect of the subject technology, server 108 determines geographical locations of users that performed actions (e.g., selecting a uniform resource locator that includes the search term, etc.) subsequent to receiving a search result based on the search term. In one example, information related to user geographical location is stored in the search history. Server 108 also determines one or more locales where the prior user action had been performed by users. In one example, each locale is associated with a particular geographical location (e.g., the United States, Germany) that members of the locale reside in. For each locale, server 108 categorizes the search term as a type that is provided for registration to a user with recognized association with the search term if the ratio of the number of times the search result was selected by users in the locale subsequent to receiving the search term to the number of times that the search term appears in the search history exceeds a fourth threshold value. For each locale, server 108 categorizes the search term as a type that is excluded from registration if the ratio of the number of times the search result was selected by users of the locale subsequent to receiving the search term to the number of times that the search term appears in the search history does not exceed the third threshold value.

Alternatively, if the number of times that the search term appears in the search history does not exceed the first threshold value, the process proceeds to block S235 and server 108 determines if the number of times that the search term appears in the search history exceeds a second threshold value. If the number of times that the search term appears in the search data does not exceed the second threshold value, the process proceeds to block S240, and server 108 categorizes the search term as a type that can be reserved on a first come first serve basis. Alternatively, if the number of times that the search term appears in the search history exceeds the second threshold value, and does not exceed the first threshold value, the process proceeds to block S245, where server 108 categorizes the search term as a type that can be reserved with additional verification of association.

Server 108 may also determine if the search term is a restricted term. In one example, a restricted term is a trademark. In another example, a restricted term includes a preposition, a noun, a verb, an adverb, an adjective, or a term that is frequently used to construct a sentence. Upon determining that the search term is a restricted term, server 108 designates the search term as a term that is excluded from registration.

Server 108, upon receipt of a user-selected term the user wishes to register as part of an URL, may filter the search terms for a search term that matches the user-selected term. In one example, a user-selected term matches a search term if the user-selected search term is identical to the search term. In another example, a user-selected term matches a search term if a portion of the user-selected search term is identical to a portion of one of the search terms. Server 108, upon obtaining a search term that matches the user-selected term, may designate registration requirement of the user selected term based on the type of the matching search term. Server 108 may provide a notification to the user, to notify the user requirements for obtaining a URL assembled with the user-selected term.

FIG. 3 is an example illustration for organizing search terms based on their respective categorization. As shown in FIG. 3, the search terms are partitioned into four areas. Area 305 contains search terms that may be registered one a first come first serve basis. In order for a search term to belong to a first come first serve type, the number of times that the search term appears in the search history must not exceed the second threshold value. Area 310 contains search terms that may be reserved with additional verification of association. In order for a search term to be categorized as a term that can be reserved with additional verification of association, the number of times that the search term appears in the search history must exceed the second threshold value but must not exceed the first threshold value.

Area 315 contains search terms that are generic and are excluded from registration. In order for a search term to be categorized as a generic term, the number of times that the search term appears in the search history must exceed the first threshold and the ratio of the number of times the search result was selected subsequent to receiving the search term to the number of times that the search term appears in the search history must not exceed the third threshold value. Area 320 contains search terms that are categorized as top term types and may be reserved by the user or entity that is recognized to be associated with the search term. In order for a search term to be categorized as a generic term, the number of times that the search term appears in the search history must exceed the first threshold value and the ratio of the number of times the search result was selected subsequent to receiving the search term to the number of times that the search term appears in the search history must exceed a third threshold value.

Figure 4:
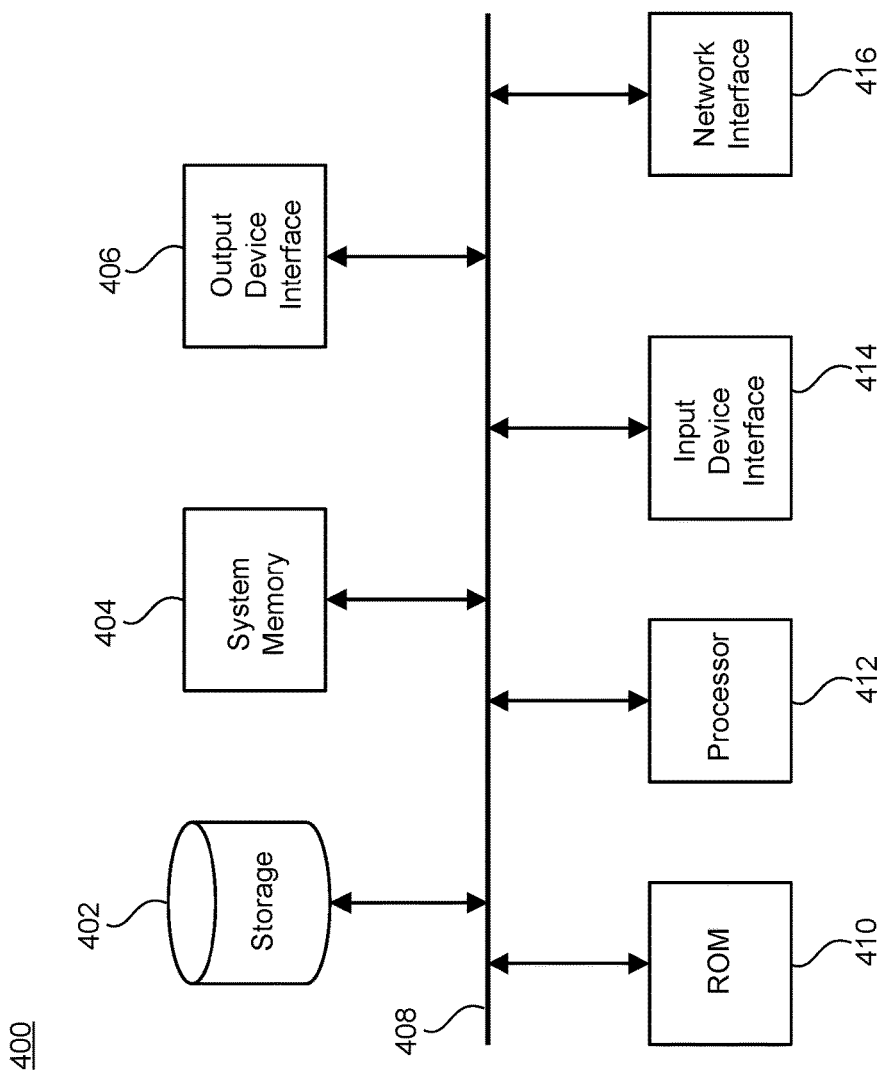
FIG. 4 conceptually illustrates an electronic system with which some implementations of the subject technology are implemented.

FIG. 4 conceptually illustrates an electronic system with which some implementations of the subject technology are implemented. Electronic system 400 can be a laptop computer, a desktop computer, smartphone, PDA, a tablet computer or any other sort of device 102, 104, and 106. Such an electronic system includes various types of computer readable media and interfaces for various other types of computer readable media. Electronic system 400 includes a bus 408, processing unit(s) 412, a system memory 404, a read-only memory (ROM) 410, a permanent storage device 402, an input device interface 414, an output device interface 406, and a network interface 416.

Bus 408 collectively represents all system, peripheral, and chipset buses that communicatively connect the numerous internal devices of electronic system 400. For instance, bus 408 communicatively connects processing unit(s) 412 with ROM 410, system memory 404, and permanent storage device 402.

From these various memory units, processing unit(s) 412 retrieves instructions to execute and data to process in order to execute the processes of the subject disclosure. The processing unit(s) can be a single processor or a multi-core processor in different implementations.

ROM 410 stores static data and instructions that are needed by processing unit(s) 412 and other modules of the electronic system. Permanent storage device 402, on the other hand, is a read-and-write memory device. This device is a non-volatile memory unit that stores instructions and data even when electronic system 400 is off. Some implementations of the subject disclosure use a mass-storage device (such as a magnetic or optical disk and its corresponding disk drive) as permanent storage device 402.

Other implementations use a removable storage device (such as a floppy disk, flash drive, and its corresponding disk drive) as permanent storage device 402. Like permanent storage device 402, system memory 404 is a read-and-write memory device. However, unlike storage device 402, system memory 404 is a volatile read-and-write memory, such a random access memory. System memory 404 stores some of the instructions and data that the processor needs at runtime. In some implementations, the processes of the subject disclosure are stored in system memory 404, permanent storage device 402, and/or ROM 410. From these various memory units, processing unit(s) 412 retrieves instructions to execute and data to process in order to execute the processes of some implementations.

Bus 408 also connects to input and output device interfaces 414 and 406. Input device interface 414 enables the user to communicate information and select commands to the electronic system. Input devices used with input device interface 414 include, for example, alphanumeric keyboards and pointing devices (also called "cursor control devices"). Output device interfaces 406 enables, for example, the display of images generated by the electronic system 400. Output devices used with output device interface 406 include, for example, printers and display devices, such as cathode ray tubes (CRT) or liquid crystal displays (LCD). Some implementations include devices such as a touchscreen that functions as both input and output devices.

Finally, as shown in FIG. 4, bus 408 also couples electronic system 400 to a network (not shown) through a network interface 416. In this manner, the computer can be a part of a network of computers (such as a local area network ("LAN"), a wide area network ("WAN"), or an Intranet, or a network of networks, such as the Internet. Any or all components of electronic system 400 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's electronic device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to an electronic device (e.g., for purposes of displaying data to and receiving user input from a user interacting with the electronic device). Data generated at the electronic device (e.g., a result of the user interaction) can be received from the electronic device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

What is claimed is:

1. A computer-implemented method comprising:
accessing, by one or more processors, a search history stored at a data store for a search term, wherein the search history comprises prior user search terms;
determining a number of times that the search term appears in the search history;
responsive to determining that the number of times that the search term appears in the search history exceeds a first threshold value,
identifying, based on the search history, a search result of the search term,
determining a ratio of a number of times the search result was selected subsequent to receiving the search term over the number of times that the search term appears in the search history, and categorizing, based on the ratio, the search term as a first type that is provided for registration to a user associated with the search term, or as a second type that is excluded from registration by the user;

receiving a registration request from a client device associated with a user over a network connection to the client device, the registration request for registering a locator corresponding to the search term; and sending, in response to receiving the registration request, a notification to the client device over the network connection, the notification comprising registration information for the locator based on the categorizing.

2. The computer-implemented method of claim 1, wherein the categorizing comprises:

categorizing the search term as the first type responsive to determining that the ratio exceeds a threshold ratio value; and categorizing the search term as the second type responsive to determining that the ratio does not exceed the threshold ratio value.

3. The computer-implemented method of claim 1, further comprising:

responsive to determining that the number of times that the search term appears in the search history does not exceed a second threshold value smaller than the first threshold value, categorizing the search term as a third type that may be registered on a first-come, first-serve basis.

4. The computer-implemented method of claim 3, further comprising:

responsive to determining that the number of times that the search term appears in the search history exceeds the second threshold value but does not exceed the first threshold value, categorizing the search term as a fourth type that may be registered with additional verification of association with the search term.

5. The computer-implemented method of claim 1, wherein the search result comprises a character string of a uniform resource locator, and wherein the character string comprises the search term.

6. The computer-implemented method of claim 1, further comprising:

determining that the search term is a restricted term; and categorizing the search term as a restricted type that is excluded from registration based on determining that the search term is the restricted term.

7. The computer-implemented method of claim 6, wherein the restricted term is a trademark.

8. The computer-implemented method of claim 1, wherein accessing the search history for the search term, and determining the number of times that the search term appears in the search history, are each performed on a periodic basis.

9. The computer-implemented method of claim 1, wherein the search term is a single term.

10. The computer-implemented method of claim 1, wherein the search term is a composite term comprising two or more terms.

11. A system comprising:

one or more processors; and a machine-readable medium comprising instructions stored therein, which when executed by the processors, cause the processors to perform operations comprising:

accessing a search history stored at a data store for a search term, wherein the search history comprises prior user search terms;

determining a number of times that the search term appears in the search history;

responsive to determining that the number of times that the search term appears in the search history exceeds a first threshold value, identifying, based on the search history, a search result of the search term, determining a ratio of a number of times the search result was selected subsequent to receiving the search term over the number of times that the search term appears in the search history, and categorizing, in a case where the ratio exceeds a threshold ratio value, the search term as a first type that is provided for registration to a user associated with the search term;

receiving a registration request from a client device associated with a user over a network connection to the client device, the registration request for registering a locator corresponding to the search term; and sending, in response to receiving the registration request, a notification to the client device over the network connection, the notification comprising registration information for the locator based on the categorizing.

12. The system of claim 11, the operations further comprising:

responsive to determining that the ratio does not exceed the threshold ratio value, categorizing the search term as a second type that is excluded from registration.

13. The system of claim 11, the operations further comprising:

responsive to determining that the number of times that the search term appears in the search history does not exceed a second threshold value smaller than the first threshold value, categorizing the search term as a third type that may be registered on a first-come, first-serve basis.

14. The system of claim 13, the operations further comprising:

responsive to determining that the number of times that the search term appears in the search history exceeds the second threshold value but does not exceed the first threshold value, categorizing the search term as a fourth type that may be registered with additional verification of association with the search term.

15. The system of claim 11, wherein the search result comprises a character string of a uniform resource locator, and wherein the character string comprises the search term.

16. The system of claim 11, the operations further comprising:

determining that the search term is a restricted term; and categorizing the search term as a restricted type that is excluded from registration based on determining that the search term is the restricted term.

17. The system of claim 16, wherein the restricted term is a trademark.

18. The system of claim 11, wherein accessing the search history for the search term, and determining the number of times that the search term appears in the search history, are each performed on a periodic basis.

19. A non-transitory machine-readable medium comprising instructions stored therein, which when executed by a processor, cause the processor to perform operations comprising:

accessing, by the processor, a search history stored at a data store for a search term, wherein the search history comprises prior user search terms;

determining a number of times that the search term appears in the search history;

responsive to determining that the number of times that the search term appears in the search history exceeds a threshold value, identifying, based on the search history, a search result of the search term, determining a ratio of a number of times the search result was selected subsequent to receiving the search term over the number of times that the search term appears in the search history, and categorizing, in a case where the ratio does not exceed a threshold ratio value, the search term as a type that is excluded from registration by a user associated with the search term;

receiving a registration request from a client device associated with a user over a network connection to the client device, the registration request for registering a locator corresponding to the search term; and sending, in response to receiving the registration request, a notification to the client device over the network connection, the notification comprising registration information for the locator based on the categorizing.

20. The non-transitory machine-readable medium of claim 19, the operations further comprising:

responsive to determining that the ratio exceeds the threshold ratio value, categorizing the search term as a type that may be registered by a user associated with the search term.

\* \* \* \* \*